(12) United States Patent
Della Flora et al.

(10) Patent No.: US 11,522,467 B2
(45) Date of Patent: Dec. 6, 2022

(54) INVERTER CIRCUIT

(71) Applicant: Danfoss Power Electronics A/S, Gråsten (DK)

(72) Inventors: Leandro Della Flora, Cary, NC (US); William Giewont, Boiling Springs, PA (US); David Michaud, Durham, NC (US); Dan Isaksson, Durham, NC (US); Andreas Doktar, Vaasa (FI)

(73) Assignee: Danfoss Power Electronics A/S, Gråsten (DK)

( * ) Notice: Subject to any disclaimer, the term of this patent is extended or adjusted under 35 U.S.C. 154(b) by 0 days.

(21) Appl. No.: 17/711,357

(22) Filed: Apr. 1, 2022

(65) Prior Publication Data

US 2022/0231616 A1    Jul. 21, 2022

Related U.S. Application Data

(63) Continuation of application No. 15/492,076, filed on Apr. 20, 2017, now Pat. No. 11,323,044.

(51) Int. Cl.
*H02M 7/487* (2007.01)
*H02M 1/32* (2007.01)
*H02M 7/797* (2006.01)

(52) U.S. Cl.
CPC ............ *H02M 7/487* (2013.01); *H02M 1/32* (2013.01); *H02M 7/797* (2013.01)

(58) Field of Classification Search
CPC ......... H02M 7/487; H02M 7/797; H02M 1/32
See application file for complete search history.

(56) References Cited

U.S. PATENT DOCUMENTS

| | | | |
|---|---|---|---|
| 6,058,031 A * | 5/2000 | Lyons | H02M 7/487 363/132 |
| 2003/0117815 A1* | 6/2003 | Saada | B60L 7/06 363/40 |
| 2009/0267545 A1* | 10/2009 | Viitanen | H02P 6/24 318/380 |
| 2010/0308584 A1* | 12/2010 | Coates | H02J 3/381 290/44 |
| 2011/0222320 A1* | 9/2011 | Delmerico | H02J 3/32 363/37 |

* cited by examiner

*Primary Examiner* — Jue Zhang
(74) *Attorney, Agent, or Firm* — McCormick, Paulding & Huber PLLC

(57) ABSTRACT

A circuit comprising a first power node for connection to a positive voltage of a DC link, a second power node for connection to a negative voltage of the DC link and a mid-point power node for connection to a mid-point voltage of the DC-link, the circuit further comprising a three-level neutral point clamped converter module and a brake resistor connection.

20 Claims, 4 Drawing Sheets

| PWM STATE | Q1 | Q2 | Q3 | Q4 |
|---|---|---|---|---|
| +1 | ON | ON | OFF | OFF |
| 0 ↔ 1 | OFF | ON | OFF | OFF |
| 0 | OFF | ON | ON | OFF |
| 0 ↔ -1 | OFF | OFF | ON | OFF |
| -1 | OFF | OFF | ON | ON |

INVERTER CIRCUIT

CROSS-REFERENCE TO RELATED APPLICATION

This application is a continuation of U.S. patent application Ser. No. 15/492,076, filed Apr. 20, 2017, which is hereby incorporated by reference in its entirety.

TECHNICAL FIELD

The present invention relates to a braking unit (or braking chopper) for an inverter.

BACKGROUND

FIG. 1 is a block diagram of a system, indicated generally by the reference numeral 1, including an adjustable speed drive (ASD). The system 1 comprises an AC power supply 2, an ASD 4 and a load 6 (such as a motor). The ASD 4 includes a rectifier 8 (often a diode-based rectifier, as shown in FIG. 1, although alternatives, such as advanced front end rectifiers are known), a DC link capacitor 10, an inverter 12 and a control module 14.

The output of the AC power source 2 is connected to the input of the rectifier 8. The output of the rectifier 8 provides DC power to the inverter 12. As described further below, the inverter 12 includes a switching module used to convert the DC voltage into an AC voltage having a frequency and phase dependent on gate control signals. The gate control signals are typically provided by the control module 14. In this way, the frequency and phase of each input to the load 6 can be controlled.

The inverter 12 is typically in two-way communication with the control module 14. The inverter 12 may monitor currents and voltages in each of the three connections to the load 6 (assuming a three-phase load is being driven) and may provide current and voltage data to the control module 14 (although the use of both current and voltage sensors is by no means essential). The control module 14 may make use of the current and/or voltage data (where available) when generating the gate control signals required to operate the load as desired; another arrangement is to estimate the currents from the drawn voltages and the switching patterns—other control arrangements also exist.

A known problem with systems such as the system 1 in that the load 6 can, in some circumstances, act as a generator. In such circumstances, the inverter 12 may feed energy back to the DC link 10 such that the DC link voltage rises. A braking chopper (or braking unit) is a circuit that can be used to dissipate energy at the DC link in order to reduce the DC link voltage. The present invention seeks to provide alternatives to known braking chopper/braking unit circuits.

BRIEF DESCRIPTION OF THE DRAWINGS

The invention will now be described in further detail with reference to the following schematic drawings, in which.

DETAILED DESCRIPTION

Figure 1:
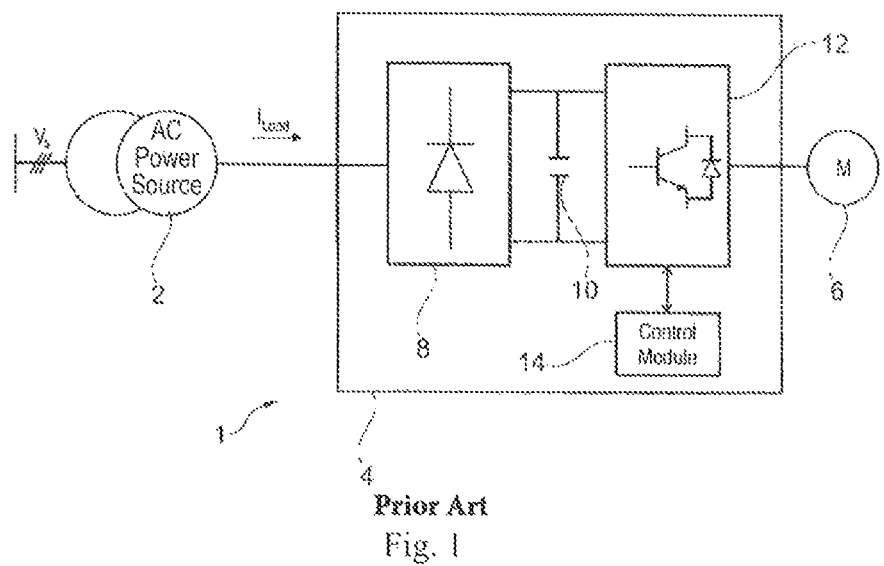
FIG. 1 is a block diagram of a known inverter system driving a load.
Figure 2:
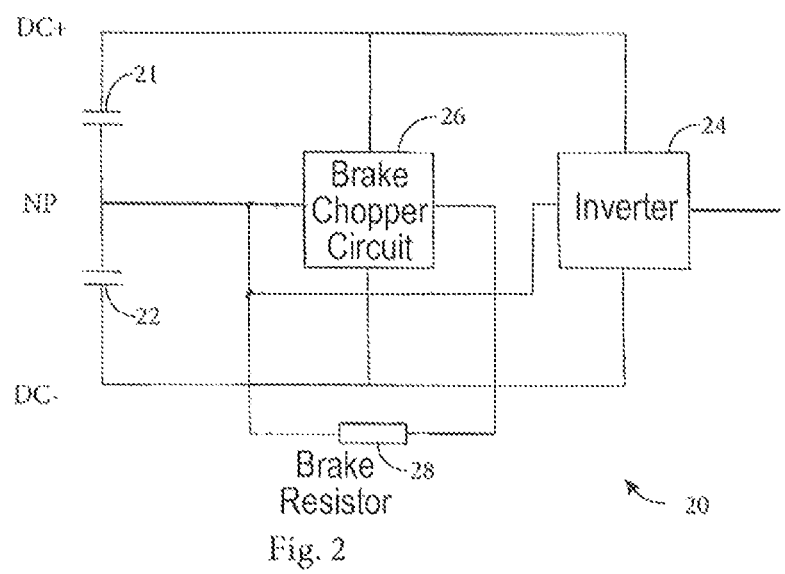
FIG. 2 shows an inverter system, including a brake chopper circuit.

FIG. 2 shows an inverter system, indicated general by the reference numeral 20, comprising a first power node connected to a positive voltage of a DC link (DC+), a second power node connected to a negative voltage of the DC link (DC−) and a mid-point power node for connection to a mid-point voltage of the DC-link (the so-called "neutral point" (NP)). A first DC link capacitor 21 is provided between the positive DC link voltage and the neutral point: a second DC link voltage is provided between the negative DC link voltage and the neutral point. The system 20 further comprises an inverter 24. The output of the inverter may be coupled to a load (such as the load 6 shown in FIG. 1).

The system also comprises a brake chopper circuit 26 having connections to the first power node, the second power node and the mid-point power node of the system 20. A braking resistor 28 is provided between an output of the brake chopper unit 26 and the mid-point power node NP.

By connecting the braking resistor 28 to the first power node through the braking chopper circuit 26, the first DC link capacitor 21 can be discharged. Similarly, by connecting the braking resistor 28 to the second power node through the braking chopper circuit 26, the second DC link capacitor 22 can be discharged. By disconnecting the braking resistor 28, the braking circuit 26 is ineffective. Thus, the brake chopper circuit 26 can be used to discharge the first and second DC link capacitors in the event that the voltage over either of those capacitors becomes too large.

Figure 3:
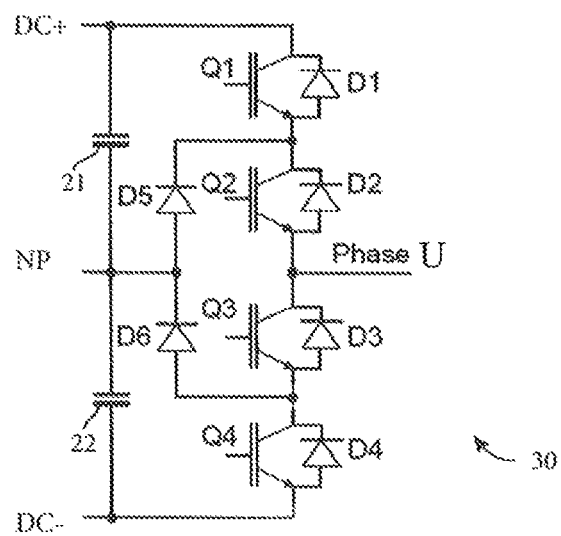
FIG. 3 shows a one-phase, three-level inverter circuit that could be used in the inverter system of FIG. 2.

FIG. 3 is a schematic circuit diagram, indicated generally by the reference numeral 30, of an exemplary three-level neutral-point inverter circuit. The inverter 30 can be used as the inverter 24 of the inverter system 20 described above. Indeed, the inverter 30 includes the positive DC link voltage (DC+), the negative DC link voltage (DC−), the neutral point (NP), the first DC link capacitor 21 and the second DC link capacitor 22 described above.

The three-level inverter 30 includes a series connection of four power semiconductor switches (labelled Q1 to Q4), each having a first node, a second node and an antiparallel diode coupled between the first and second nodes. As shown in FIG. 3, the first node of the first power semiconductor switch (Q1) is connected to the first power node (DC+) and the first node of each of the other power semiconductor switches (Q2 to Q4) is connected to the second nodes of the next semiconductor switch in the series. The second node of the second power semiconductor switch (Q2) in the series provides the output of the inverter. The second node of fourth power semiconductor switch (Q4) in the series is connected to the second power node (DC−).

The inverter 30 also includes a series connection of two internal diodes (D5, D6), the first diode being connected between the first node of a second semiconductor switch (Q2) and the mid-point power node (NP) and the second diode (D6) being connected between the mid-point power node and the second node of a third power semiconductor switch (Q3).

As is well known in the art, the switches Q1 to Q4 can be set in order to set the output (Phase U in FIG. 3) to any one of three levels, thereby providing a one-phase, three-level inverter circuit.

Figure 4:
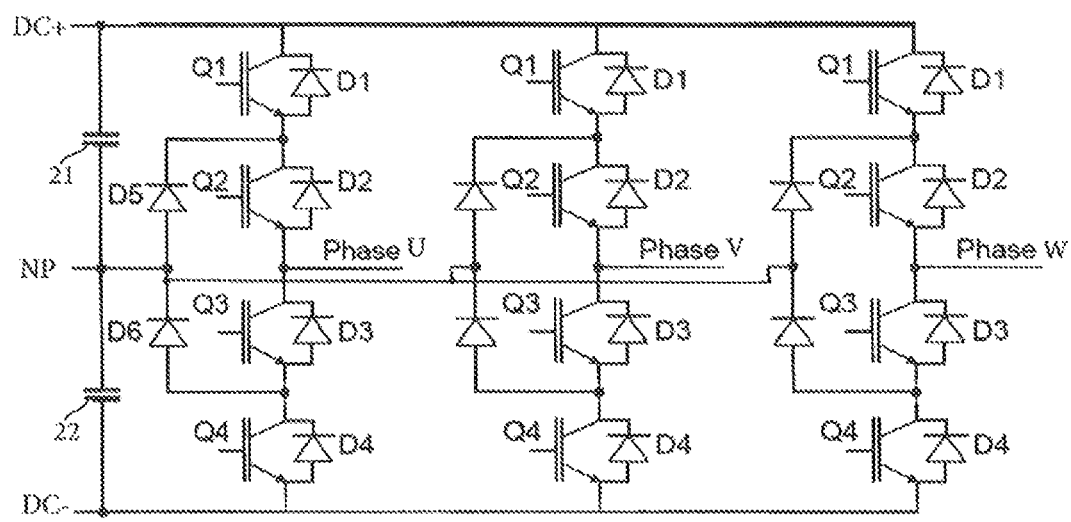
FIG. 4 shows a three-phase, three-level inverter circuit that could be used in the inverter system of FIG. 2.

The inverter 24 of the inverter system 20 can take other forms. For example, FIG. 4 is a schematic circuit diagram, indicated generally by the reference numeral 40, of an exemplary three-phase, three-level neutral-point inverter circuit. The inverter 40 can be used as the inverter 24 of the inverter system 20 described above. As with the inverter described above, the inverter 40 includes the positive DC link voltage (DC+), the negative DC link voltage (DC−), the neutral point (NP), the first DC link capacitor 21 and the second DC link capacitor 22 described above.

As shown in FIG. 4, the inverter circuit 40 comprises three one-phase inverter circuit (of the form shown in FIG. 3) arranged in parallel. As is well known in the art, the switches Q1 to Q4 of each of the parallel inverters can be set in order to set the outputs (Phase U, Phase V and Phase W in FIG. 4) to any one of three levels, thereby providing a three-phase, three-level inverter circuit.

Figures 5, 6:
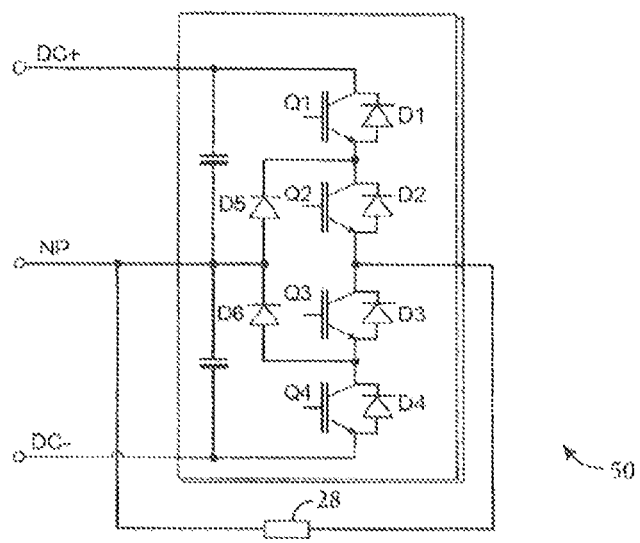
FIG. 5 shows a brake chopper circuit.
FIG. 6 is a table showing switching states of the brake chopper circuit of FIG. 5.

FIG. 5 shows a brake chopper circuit, indicated generally by the reference numeral 50 that can be used to implement the brake chopper circuit 26 described above. In common with the inverter system 20 described above, the brake chopper circuit 50 includes the positive DC link voltage (DC+), the negative DC link voltage (DC−) and the neutral point (NP). The brake chopper circuit 30 includes the first DC link capacitor 21, the second DC link capacitor 22 and the brake resistor 28 described above. The brake resistor 28 is connected between an output of a three-level neutral point clamped converter module and the mid-point power node.

The three-level neutral point clamped converter module of the brake chopper circuit 50 has a first input connected to the first power node, a second input connected to the second power node and a neutral point connected to the mid-point power node and an output. The brake chopper circuit 50 also includes a series connection of four power semiconductor switches (labelled Q1 to Q4), each having a first node, a second node and an antiparallel diode coupled between the first and second nodes.

As shown in FIG. 5, the first node of the first power semiconductor switch (Q1) is connected to the first power node (DC+) and the first node of each of the other power semiconductor switches (Q2 to Q4) is connected to the second nodes of the next semiconductor switch in the series. The second node of the second power semiconductor switch (Q2) in the series is connected to the output of the neutral point clamped converter (and so to one side of the brake resistor 28). The second node of fourth power semiconductor switch (Q4) in the series is connected to the second power node (DC−).

The brake chopper circuit 50 also includes a series connection of two internal diodes (D5, D6), the first diode being connected between the first node of a second semiconductor switch (Q2) and the mid-point power node (NP) and the second diode (D6) being connected between the mid-point power node and the second node of a third power semiconductor switch (Q3).

Thus, it can be seen that the brake chopper module includes the same underlying circuitry as the inverter modules described above with reference to FIGS. 3 and 4.

FIG. 6 is a table showing switching states of the converter module of FIG. 4.

In the PWM state +1, the switches Q1 and Q2 are on (i.e. closed) and the switches Q3 and Q4 are off (i.e. open). In this state, the upper capacitor 21 is connected to the neutral point NP via the brake resistor 28. Thus, the upper capacitor 21 is discharged in the PWM state +1.

Conversely, in the PWM state −1, the switches Q1 and Q2 are off (i.e. open) and the switches Q3 and Q4 are on (i.e. closed). In this state, the low capacitor 22 is connected to the neutral point NP via the brake resistor. Thus, the lower capacitor 22 is discharged in the PWM state −1.

In the PWM state 0, the switches Q2 and Q3 are on (open) and the switches Q1 and Q4 off (closed). In this state, the capacitor 21 is disconnected from the brake resistor 28 by virtue of the open switch Q1 and the capacitor 22 is disconnected from the brake resistor 28 by the open switch Q4. Thus, in the PWM state 0, neither capacitor is discharged.

Whilst transitioning between the PWM state 0 and the PWM state 1 (in either direction), the switch Q2 is on (closed) and the other switches (including Q1) are off (open). Thus, as with the PWM state, the capacitor 21 is disconnected from the brake resistor by virtue of the open switch Q1 and the capacitor 22 is disconnected from the brake resistor 28 by the open switch Q4. Thus, neither capacitor is discharged.

Similarly, whilst transitioning between the PWM state 0 and the PWM state −1 (in either direction), the switch Q3 is on (closed) and the other switches (including Q1) are off (open). Thus, as with the PWM state, the capacitor 21 is disconnected from the brake resistor by virtue of the open switch Q1 and the capacitor 22 is disconnected from the brake resistor 28 by the open switch Q4. Thus, neither capacitor is discharged.

Refer again to FIG. 2. In a one-phase system, the circuits 24 and 26 can be identical. This provides an element of simplicity and also allows circuit blocks to be re-used. This is attractive in some implementations. Thus, whilst the functionality of the brake chopper 50 could be replaced with a simple two-transistor solution, the four-transistor solution described herein may be more convenient in some implementations.

Similarly, in a three-phase system, the brake chopper circuit 26 is identical to the blocks that are arranged in parallel to make the inverter circuit 28.

Figure 7:
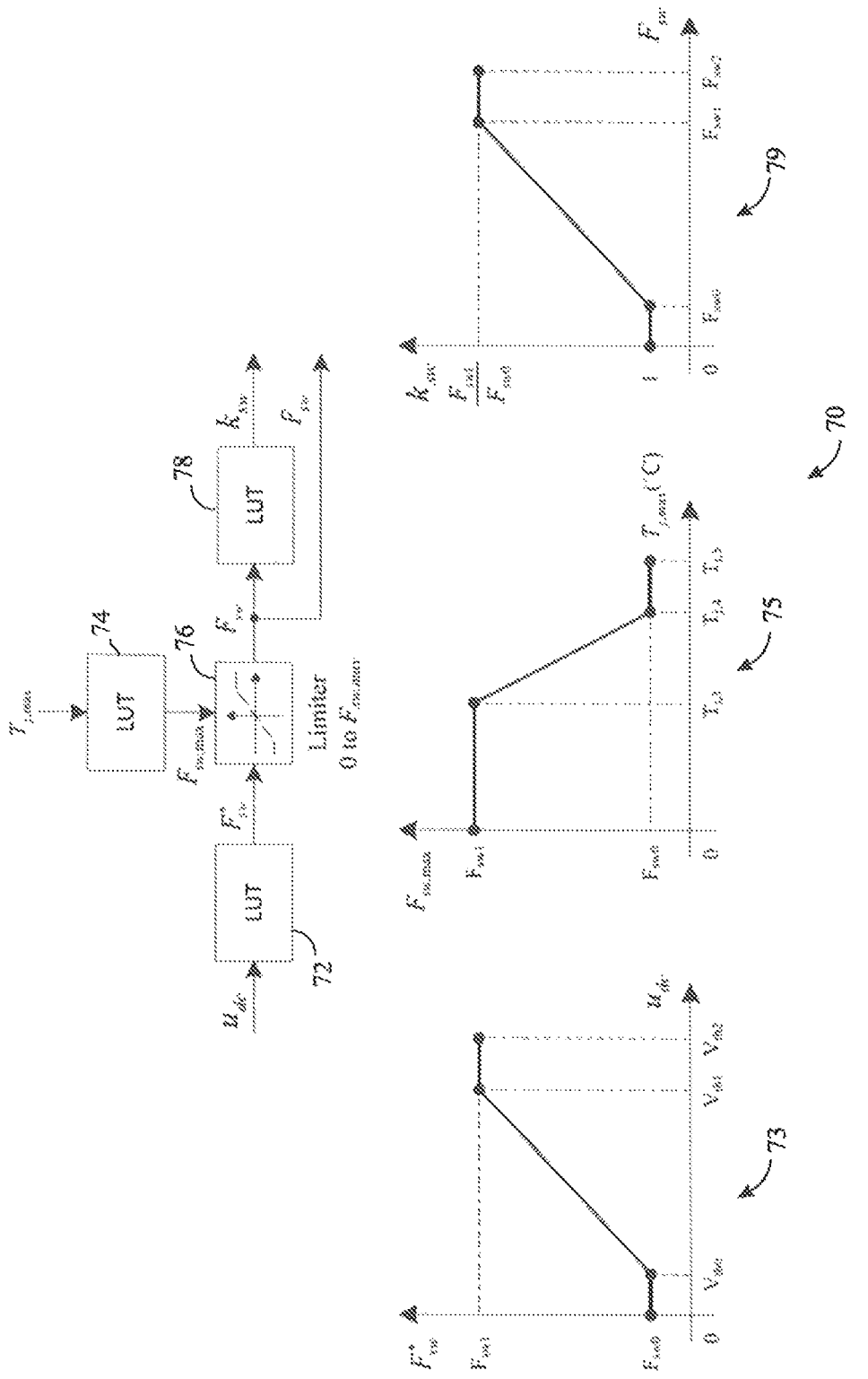
FIG. 7 shows a control arrangement for a brake chopper circuit.

FIG. 7 shows a control circuit, indicated generally by the reference numeral 70, for controlling a brake chopper circuit, such as the brake chopper circuit 50 described above. The control circuit 70 comprises a first module 72, a second module 74, a third module 76 and a fourth module 78.

The first module 72 of the control circuit 70 has a first input $u_{dc}$ and outputs a first switching frequency signal $F^*_{sw}$ to the third module 76. As shown in the graphic 73, the first module 72 sets the first switching frequency signal $F^*_{sw}$ to be between a lower limit ($F_{sw0}$) and an upper limit ($F_{sw1}$) depending on the DC link voltage ($U_{dc}$). Specifically, if the DC link voltage is at or below a first threshold level ($V_{th0}$), the first switching frequency signal $F^*_{sw}$ is set to the lower limit ($F_{sw0}$) and if the DC link voltage is at or above a second threshold level ($V_{th1}$), the first switching frequency signal $F^*_{sw}$ is set to the upper limit ($F_{sw1}$). If the DC link voltage is between the first and second thresholds, then the first switching frequency signal $F^*_{sw}$ is set on a sliding scale between the upper and lower limits. The first switching frequency signal $F^*_{sw}$ may be generated from the first input $u_{dc}$ by a look up table (LUT).

The second module 74 of the control circuit 70 has a first input $T_{j,\ max}$ and outputs a maximum switching frequency signal $F_{sw,max}$ to the third module 66. The first input $T_{j,\ max}$ is a measure of an IGBT junction temperature in the switching module of the brake chopper circuit being controlled. As shown in the graphic 75, the second module 74 sets the maximum switching frequency $F_{sw,max}$ to be between the lower limit ($F_{sw0}$) and the upper limit ($F_{sw1}$) described above, depending on a detected IGBT junction temperature $T_{j, max}$. Specifically, if the IGBT junction temperature is at or below a first threshold level ($T_{j,3}$), the maximum switching frequency signal is set to the upper limit ($F_{sw1}$) and if the IGBT junction temperature is at or above a second threshold level ($V_{j,4}$), the maximum switching frequency signal is set to the lower limit ($F_{sw0}$). If the IGBT junction temperature is between the first and second thresholds, then the maximum switching frequency signal $F_{sw, max}$ is set on a sliding scale between the upper and lower limits. The maximum switching frequency signal may be generated from the first input by a look up table (LUT).

The third module 76 receives the first switching frequency signal ($F^*_{sw}$) output by the first module 72 and the maximum switching frequency signal $F_{sw,max}$) output by the second module 74 and outputs a switching frequency signal ($F_{sw}$). The switching frequency signal ($F_{sw}$) output by the third module is simply the first switching frequency signal ($F^*_{sw}$) output by the first module 72 subject to an upper limit as provided by the maximum switching frequency signal $F_{sw, max}$) output by the second module 74.

In the way, the switching frequency of the brake chopper circuit can be increased as the DC link voltage of a system increases (so that the brake chopper reduces the DC link more quickly when the DC link is higher). However, at the same time, the switching frequency is capped in the event that the IGBT junction temperature rise to high levels (since allowing the switching frequency to rise in these circumstances might risk damaging the IGBTs of the brake chopper circuit).

As shown in FIG. 6, the switching frequency signal ($F_{sw}$) output by the third module is provided as an output of the control circuit 70 and is also provided as an input to the fourth module 78 of the control circuit 70.

The fourth module 78 of the control circuit 70 outputs a proportional gain signal $k_{sw}$ as an output of the control circuit 70. The proportional gain signal determines the speed of response of the brake chopper circuit of the invention. As shown in the graphic 79, the fourth module 78 sets the proportional gain $k_{sw}$ to be between a lower limit (1) and an upper limit ($F_{sw1}/F_{sw0}$), depending on the switching frequency signal ($F_{sw}$). Specifically, if the switching frequency signal ($F_{sw}$) is at or below the lower limit ($F_{sw0}$), the proportional gain is set to the lower limit (1) and if the switching frequency signal ($F_{sw}$) is at or above the upper limit ($F_{sw1}$), the proportional gain is set to the upper limit ($F_{sw1}/F_{sw0}$). If the switching frequency signal is between the upper and lower limits, then the proportional gain is set on a sliding scale between the upper and lower limits. The proportional gain may be generated from the first input by a look up table (LUT).

The embodiments of the invention described above are provided by way of example only. The skilled person will be aware of many modifications, changes and substitutions that could be made without departing from the scope of the present invention. The claims of the present invention are intended to cover all such modifications, changes and substitutions as fall within the spirit and scope of the invention.

What is claimed is:

1. A control circuit for controlling a brake chopper circuit comprising:
    a control arrangement;
    wherein the brake chopper circuit comprises
        a first power node for connection to a positive voltage of a DC link;
        a second power node for connection to a negative voltage of the DC link;
        a mid-point power node for connection to a mid-point voltage of the DC link;
        a three-level neutral point clamped inverter having a first input connected to the first power node, a second input connected to the second power node, a neutral point connected to the mid-point power node, and an output;
        a three-level neutral point clamped converter module having a first input connected to the first power node, a second input connected to the second power node, a neutral point connected to the mid-point power node, and an output; and
        a brake resistor connected between the output of the three-level neutral point clamped converter module and the mid-point power node;
    wherein the control arrangement is configured to output a control switching frequency signal to the brake chopper circuit based on a DC link voltage of the DC link.

2. The control circuit as claimed in claim 1, wherein the three-level neutral point clamped converter module comprises a series connection of a first power semiconductor switch, a second power semiconductor switch, a third power semiconductor switch and a fourth power semiconductor switch, each having a first node, a second node and an antiparallel diode coupled between the first and second nodes, wherein:
    the first node of the first power semiconductor switch of the series connection is connected to the first power node;
    the first node of the second power semiconductor switch of the series connection is connected to the second node of the first power semiconductor switch;
    the first node of the third power semiconductor switch of the series connection is connected to the second node of the second power semiconductor switch;
    the first node of the fourth power semiconductor switch of the series connection is connected to the second node of the third power semiconductor switch;
    the second node of the second power semiconductor switch in the series is connected to the output of the neutral point clamped converter module; and
    the second node of fourth power semiconductor switch in the series is connected to the second power node.

3. The control circuit as claimed in claim 2, wherein the neutral point clamped converter module further comprises a series connection of internal diodes, a first diode of the series connection being connected between the first node of a second semiconductor switch in the plurality and the mid-point power node and a second diode of the series connection being connected between the mid-point power node and the second node of a third power semiconductor switch of the series connection.

4. The control circuit as claimed in claim 1, further comprising a first DC link capacitor connected between the first power node and the mid-point power node and a second DC link capacitor connected between the mid-point power node and the second power node.

5. The control circuit as claimed in claim 1, wherein the control arrangement sets the control switching frequency signal to a lower limit when the DC link voltage is at or below a first voltage threshold level, and wherein the control arrangement sets the control switching frequency signal to an upper limit when the DC link voltage is at or above a second voltage threshold level.

6. The control circuit as claimed in claim 5, wherein the control arrangement sets the control switching frequency signal in accordance with a voltage look up table when the DC link voltage is above the first voltage threshold level and below the second voltage threshold level.

7. The control circuit as claimed in claim 1, wherein the control arrangement sets the switching frequency signal in accordance with a voltage look up table.

8. The control circuit as claimed in claim 1, wherein the control arrangement is configured to output the control switching frequency signal to the brake chopper circuit further based on a measure of IGBT junction temperature in a switching module of the brake chopper circuit.

9. The control circuit as claimed in claim 8, wherein the control arrangement sets the control switching frequency signal to an upper limit when the measure of IGBT junction temperature is at or below a first temperature threshold level, and wherein the control arrangement sets the control switching frequency signal to a lower limit when the measure of IGBT junction temperature is at or above a second temperature threshold level.

10. The control circuit as claimed in claim 9, wherein the control arrangement sets the control switching frequency signal in accordance with an IGBT junction temperature look up table when the measure of IGBT junction temperature is above the first temperature threshold level and below the second temperature threshold level.

11. The control circuit as claimed in claim 1, wherein, based on the control switching frequency signal, the control arrangement is configured to output a proportional gain signal for determining a speed of response of the brake chopper circuit.

12. The control circuit as claimed in claim 11, wherein the control arrangement sets the proportional gain signal in accordance with a control switching frequency signal look up table when the control switching frequency signal is above a first control switching frequency signal threshold level and below a second control switching frequency signal threshold level.

13. A control circuit for controlling a brake chopper circuit comprising:
 a control arrangement comprising a first module, a second module and a third module;
 wherein the brake chopper circuit comprises
  a first power node for connection to a positive voltage of a DC link;
  a second power node for connection to a negative voltage of the DC link;
  a mid-point power node for connection to a mid-point voltage of the DC link;
  a three-level neutral point clamped inverter having a first input connected to the first power node, a second input connected to the second power node, a neutral point connected to the mid-point power node, and an output;
  a three-level neutral point clamped converter module having a first input connected to the first power node, a second input connected to the second power node, a neutral point connected to the mid-point power node, and an output; and
  a brake resistor connected between the output of the three-level neutral point clamped converter module and the mid-point power node;
 wherein the first module is configured to receive a DC link voltage of the DC link and output a first switching frequency signal to the third module based on the DC link voltage;
 wherein the second module is configured to receive a measure of IGBT junction temperature of a switching module of the brake chopper circuit and output a maximum switching frequency signal to the third module based on the measure of IGBT junction temperature; and
 wherein the third module is configured to output a control switching frequency signal to the brake chopper circuit equal to the first switching frequency signal subject to a maximum limit provided by the maximum switching frequency signal.

14. The control circuit as claimed in claim 13, wherein the first module sets the first switching frequency signal to a lower limit when the DC link voltage is at or below a first voltage threshold level, wherein the first module sets the first switching frequency signal to an upper limit when the DC link voltage is at or above a second voltage threshold level, and wherein the first module sets the first switching frequency signal in accordance with a voltage look up table when the DC link voltage is above the first voltage threshold level and below the second voltage threshold level.

15. The control circuit as claimed in claim 13, wherein the second module sets the maximum switching frequency signal to an upper limit when the measure of IGBT junction temperature is at or below a first temperature threshold level, wherein the second module sets the maximum switching frequency signal to a lower limit when the measure of IGBT junction temperature is at or above a second temperature threshold level, and wherein the control arrangement sets the maximum switching frequency signal in accordance with an IGBT junction temperature look up table when the measure of IGBT junction temperature is above the first temperature threshold level and below the second temperature threshold level.

16. The control circuit as claimed in claim 13, the control arrangement further comprising a fourth module, wherein the fourth module is configured to output a proportional gain signal for determining a speed of response of the brake chopper circuit, and wherein the fourth module sets the proportional gain signal in accordance with a control switching frequency signal look up table when the control switching frequency signal is above a first control switching frequency signal threshold level and below a second control switching frequency signal threshold level.

17. An inverter circuit comprising:
 a first power node for connection to a positive voltage of a DC link;
 a second power node for connection to a negative voltage of the DC link;
 a mid-point power node for connection to a mid-point voltage of the DC link;
 a three-level neutral point clamped inverter having a first input connected to the first power node, a second input connected to the second power node, a neutral point connected to the mid-point power node, and an output;
 a three-level neutral point clamped converter module having a first input connected to the first power node, a second input connected to the second power node, a neutral point connected to the mid-point power node, and an output;
 a brake resistor connected between the output of the three-level neutral point clamped converter module and the mid-point power node; and
 a control arrangement configured to output a control switching frequency signal to the three-level neutral point clamped converter module based on one or more look up tables.

18. The inverter circuit as claimed in claim 17, wherein a first look up table of the one or more look up tables sets a first switching frequency signal in accordance with a DC link voltage.

19. The inverter circuit as claimed in claim 18, wherein a second look up table of the one or more look up tables sets a maximum switching frequency signal in accordance with a temperature of an IGBT junction temperature of a switching module of the inverter system.

20. The inverter circuit as claimed in claim 19, wherein a third look up table of the one or more look up tables sets a proportional gain signal for determining a speed of response of the inverter system in accordance with the control switching frequency signal.

\* \* \* \* \*